US006650454B2

(12) United States Patent
Azami et al.

(10) Patent No.: US 6,650,454 B2
(45) Date of Patent: Nov. 18, 2003

(54) MULTI-BEAM SCANNING OPTICAL SYSTEM AND IMAGE FORMING APPARATUS USING THE SAME

(75) Inventors: Junya Azami, Shizuoka (JP); Manabu Kato, Tochigi (JP); Yutaka Ishikawa, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 64 days.

(21) Appl. No.: 10/090,147

(22) Filed: Mar. 5, 2002

(65) Prior Publication Data
US 2003/0043441 A1 Mar. 6, 2003

(30) Foreign Application Priority Data
Mar. 9, 2001 (JP) ........................................ 2001-066216

(51) Int. Cl.[7] .............................................. G02B 26/08
(52) U.S. Cl. ........................ 359/204; 359/205; 359/216; 347/243
(58) Field of Search ................................ 359/204–208, 359/216–219; 347/232–235, 241–244

(56) References Cited

U.S. PATENT DOCUMENTS 5,838,480 A * 11/1998 McIntyre et al. ............ 359/205
6,185,026 B1   2/2001 Hayashi et al. ............. 359/204
6,342,964 B2 *  1/2002 Kamikubo ................... 359/205

FOREIGN PATENT DOCUMENTS

JP         2000-111820          4/2000

* cited by examiner

Primary Examiner—James Phan
(74) Attorney, Agent, or Firm—Fitzpatrick, Cella, Harper & Scinto

(57) ABSTRACT

A multi-beam scanning optical system includes a plurality of light sources, a deflecting unit which deflects a plurality of laser beams emitted from the light sources, and a scanning optical unit which focuses the laser beams deflected by the deflecting unit onto the surface of a photosensitive member. The scanning optical unit is set such that lateral chromatic aberration is overcorrected. In addition, among angles formed between each laser beam incident on the surface of the photosensitive member and the normal at the surface of the photosensitive member in a sub-scanning direction, the oscillation wavelength of the light source that emits a laser beam forming the minimum angle is set to a value smaller than the oscillation wavelength of the light source that emits a laser beam forming the maximum angle.

20 Claims, 13 Drawing Sheets

MULTI-BEAM SCANNING OPTICAL SYSTEM AND IMAGE FORMING APPARATUS USING THE SAME

BACKGROUND OF THE INVENTION

1. Field of the Invention

The present invention relates to a multi-beam scanning optical system and an image forming apparatus using the multi-beam scanning optical system. The present invention can be suitably applied to, for example, a laser beam printer or a digital copy machine with which high-speed, high-quality printing can be performed by simultaneously forming (recording) a plurality of scanning lines (dots) on the surface of a photosensitive member.

2. Description of the Related Art

In image forming apparatuses such as laser beam printers and digital copy machines, multi-beam scanning optical systems, with which a plurality of scanning lines can be simultaneously formed on the surface of a photosensitive member, are commonly used in order to perform high-speed printing.

In multi-beam scanning optical systems, there is a problem in that if the oscillation wavelengths of light sources are different from each other, dots in scanning lines formed by laser beams emitted from the light sources are displaced in a main-scanning direction due to the chromatic aberration of scanning lenses.

Accordingly, in Japanese Unexamined Patent Application Publication No. 2000-111820, a system is disclosed in which relative differences between the oscillation wavelengths of light sources are limited so that the dot displacement is reduced to within one-half of the size of a single pixel.

However, in color-image forming apparatuses which output halftone images such as color laser printers, etc., the dot displacement is not small enough when the allowable value thereof is one-half of the size of a single pixel.

FIGS. 12 and 13 are diagrams showing an example of a halftone image pattern which is generally used for forming a color image, where FIG. 12 shows a case in which dots are arranged without displacements in the main-scanning direction and FIG. 13 shows a case in which the dots are displaced in the main-scanning direction.

FIGS. 12 and 13 show a case in which two light beams are used. The solid lines extending in the horizontal direction are formed by one of the two light beams, and the dashed lines extending in the horizontal direction are formed by the other one of the light beams. In addition, the circles shown on the horizontal lines are dots formed by the scanning lines.

In FIG. 13, a region in which the gaps between the dots are wide (Wa) and a region in which the gaps between the dots are narrow (Wb) are alternately formed in an inclined manner. Since the regions in which the gaps between the dots are narrow appear dark and the regions in which the gaps between the dots are wide appear light in an actual image, this image looks like a striped pattern over the entire image area. In color laser printers, etc., many kinds of patterns like that shown in FIGS. 12 and 13 are used, and a small dot displacement may greatly affect the image depending on the pattern. Therefore, it is necessary to set an allowable value of the dot displacement (Wa–Wb) to an extremely small value such as one-fourth of the size of a single pixel.

The above-described dot displacement in the main-scanning direction is caused not only by the difference in oscillation wavelengths but also by a difference in light path lengths.

Next, the dot displacement due to a difference in light path lengths will be described below with reference to FIGS. 14 and 15.

FIG. 14 is a sectional view of the main part of a multi-beam scanning optical system cut along the main-scanning direction (main-scanning sectional view), and FIG. 15 is a sectional view of the main part of the multi-beam scanning optical system shown in FIG. 14 cut along the sub-scanning direction (sub-scanning sectional view).

In FIGS. 14 and 15, a light source unit 100 includes two light sources (laser beam sources) 101 and 102 formed of, for example, semiconductor lasers. A collimator lens 103 collimates two laser beams emitted by the light source unit 100, and a cylindrical lens 104 has a predetermined refractive power only in the sub-scanning direction. In addition, an aperture diaphragm 108 forms the laser beams emitted from the cylindrical lens 104 into optimal shapes. The collimator lens 103, the cylindrical lens 104, and the aperture diaphragm 108 form one element of an incident optical unit 114.

A deflector 105 serves as a deflecting unit, and is formed of, for example, a rotating polygon mirror. The deflector 105 is rotated in the direction shown by the arrow A at a constant speed by a driving unit (not shown) such as a motor, etc. A scanning optical unit 106 has fθ characteristics and includes first and second fθ lenses 106a and 106b. The two laser beams deflected by the deflector 105 are focused onto the surface of a photosensitive member (recording medium) 107 by the scanning optical unit 106 in the shape of spots, so that two scanning lines S101 and S102 are formed. The scanning optical unit 106 is constructed such that a deflecting surface 105a of the deflector 105 and the surface of the photosensitive member 107 are conjugate to each other in the sub-scanning cross section, so that surface tilting is corrected.

The photosensitive member (photosensitive drum) 107 has an approximately cylindrical shape, and serves as a recording medium.

In FIGS. 14 and 15, two laser beams B101 and B102, which are optically modulated in accordance with image information, are emitted from the light source unit 100, collimated by the collimator lens 103, and incident on the cylindrical lens 104. The two laser beams B101 and B102 incident on the cylindrical lens 104 leave the cylindrical lens 104 without a change in the main-scanning cross section, and pass through the aperture diaphragm 108 (a part of each laser beam is blocked). In the sub-scanning cross section, the two laser beams B101 and B102 converge before they pass through the aperture diaphragm 108 (a part of each laser beam is blocked). Accordingly, the two laser beams B101 and B102 are focused onto the deflecting surface 105a of the deflector 105 in the shape of lines (lines that extend in the main-scanning direction). Then, the laser beams B101 and B102 are deflected by the deflecting surface 105a of the deflector 105 and focused onto the surface of the photosensitive member 107 by the scanning optical unit 106 in the shape of spots. By rotating the deflector 105 in the direction shown by the arrow A, the laser beams B101 and B102 scan over the surface of the photosensitive member 107 in the direction shown by the arrow B (in the main-scanning direction) at a constant speed. Accordingly, an image is recorded on the surface of the photosensitive member 107, which serves as the recording medium.

In FIGS. 14 and 15, the laser beams B101 and B102 are emitted from the light sources 101 and 102, travel along light paths L101 and L102, and form the scanning lines S101 and S102, respectively.

As shown in FIG. 15, the laser beams B101 and B102 must be incident on the surface of the photosensitive member 107 at positions displaced from the end point T of the photosensitive member 107 in the sub-scanning direction. In the case in which the laser beams B101 and B102 are incident on the surface of the photosensitive member 107 at the end point T, the following problem occurs. That is, when the laser beams B101 and B102 are at positions close to the central point in the main-scanning direction, they are reflected by the surface of the photosensitive member 107, travel along the same light paths along which they have traveled in the reverse direction, and return to the light sources 101 and 102. Accordingly, the optical outputs of the semiconductor lasers vary due to noise caused by the laser beams returning from the photosensitive member 107, and the density of a printed image also varies.

However, when the laser beams B101 and B102 are incident on the surface of the photosensitive member 107 at positions displaced from the end point T, the lengths of the light paths L101 and L102 differ by ΔB. In this case, as is apparent from FIG. 15, the lengths of the two scanning lines S101 and S102 also differ from each other. This is the manner in which the dot displacement in the main-scanning direction occurs due to the difference in light path lengths. Moreover, the dot displacement in the main-scanning direction caused by the difference in light path lengths is not small enough to be ignored.

SUMMARY OF THE INVENTION

Accordingly, an object of the present invention is to provide a multi-beam scanning optical system and an image forming apparatus using the multi-beam scanning optical system, in which the dot displacement in the main-scanning direction caused by the difference in wavelengths of the light sources and that caused by the difference in light path lengths of the laser beams counterbalance each other. In this way, the difference between magnifications can be corrected and the dot displacement in the main-scanning direction can be reduced, so that high-quality printing can be performed.

According to a first aspect of the present invention, a multi-beam scanning optical system includes a plurality of light sources; a deflecting unit which deflects a plurality of laser beams emitted from the light sources; and a scanning optical unit which focuses the laser beams deflected by the deflecting unit onto the surface of a photosensitive member. The scanning optical unit is set such that lateral chromatic aberration is overcorrected. In addition, among angles formed between each laser beam incident on the surface of the photosensitive member and the normal at the surface of the photosensitive member in a sub-scanning direction, the oscillation wavelength of the light source that emits a laser beam forming the minimum angle is set to a value smaller than the oscillation wavelength of the light source that emits a laser beam forming the maximum angle.

According to a second aspect of the present invention, a multi-beam scanning optical system includes n light sources; a deflecting unit which deflects n laser beams emitted from the n light sources; and a scanning optical unit which focuses the n laser beams deflected by the deflecting unit onto the surface of a photosensitive member having a cylindrical shape and forms n scanning lines. The scanning optical unit is set such that lateral chromatic aberration is overcorrected. In addition, when the first scanning line is formed on the surface of the photosensitive member at a position displaced from an end point of the photosensitive member by a distance S in a sub-scanning direction and the $m^{th}$ ($1 < m \leq n$) scanning line is formed on the surface of the photosensitive member at a position displaced from the end point by a distance (S+d) in the sub-scanning direction, and when the oscillation wavelength of the light source which emits the light beam forming the first scanning line is defined as $\lambda_1$ and the oscillation wavelength of the light source which emits the light beam forming the $m^{th}$ scanning line is defined as $\lambda_m$, the following expressions are satisfied:

$$|\Delta Y_1 - \Delta Y_2 (\lambda_m - \lambda_1)| \leq \frac{D}{4}$$

$$\Delta Y_1 = \Delta L \tan \alpha$$

$$\Delta L = \sqrt{R^2 - (S+d)^2} - \sqrt{R^2 - S^2}$$

wherein,
$\Delta Y_2$: dot displacement in the main-scanning direction at the end in the main-scanning direction caused per unit wavelength
D: size of a single pixel
α: maximum angle among angles formed between the normal at the surface of the photosensitive member and the laser beams in the main-scanning direction
R: radius of the photosensitive member.

In this case, preferably, $\lambda_1$ and $\lambda_m$ satisfy the following expression:

$$-1 \leq \lambda_m - \lambda_1 \leq 3 \text{ (unit: nm)}.$$

In the multi-beam scanning optical system according to the above-described first and second aspects of the present invention, the scanning optical unit may include at least one diffractive optical element.

In addition, the multi-beam scanning optical system according to the above-described first and second aspects of the present invention may further include a synchronization position detection unit in which parts of the laser beams deflected by the deflecting unit are directed to a synchronization detection element by a synchronization detection lens, and which controls the time at scanning start position on the surface of the photosensitive member by using a signal obtained from the synchronization detection element. The synchronization detection lens is disposed in such a manner that the synchronization detection lens is centered and untilted relative to a light path from the deflecting unit to the synchronization detection element.

According to a third aspect of the present invention, a multi-beam scanning optical system includes a plurality of light sources; a deflecting unit which deflects a plurality of laser beams emitted from the light sources; and a scanning optical unit which focuses the laser beams deflected by the deflecting unit onto the surface of a photosensitive member. The scanning optical unit is set such that lateral chromatic aberration is undercorrected. In addition, among angles formed between each laser beam incident on the surface of the photosensitive member and the normal at the surface of the photosensitive member in a sub-scanning direction, the oscillation wavelength of the light source that emits a laser beam forming the minimum angle is set to a value larger than the oscillation wavelength of the light source that emits a laser beam forming the maximum angle.

According to a fourth aspect of the present invention, a multi-beam scanning optical system includes n light sources; a deflecting unit which deflects n laser beams emitted from the n light sources; and a scanning optical unit which focuses the n laser beams deflected by the deflecting unit onto the surface of a photosensitive member having a cylindrical shape and forms n scanning lines. The scanning optical unit is set such that lateral chromatic aberration is undercorrected. In addition, when the first scanning line is formed on the surface of the photosensitive member at a position displaced from an end point of the photosensitive member by a distance S in a sub-scanning direction and the $m^{th}$ (1<m≦n) scanning line is formed on the surface of the photosensitive member at a position displaced from the end point by a distance (S+d) in the sub-scanning direction, and when the oscillation wavelength of the light source which emits the light beam forming the first scanning line is defined as $\lambda_1$ and the oscillation wavelength of the light source which emits the light beam forming the $m^{th}$ scanning line is defined as $\lambda_m$, the following expressions are satisfied:

$$|\Delta Y_1 - \Delta Y_2(\lambda_1 - \lambda_m)| \le \frac{D}{4}$$

$$\Delta Y_1 = \Delta L \tan\alpha$$

$$\Delta L = \sqrt{R^2 - (S+d)^2} - \sqrt{R^2 - S^2}$$

wherein, $\Delta Y_2$: dot displacement in the main-scanning direction at the end in the main-scanning direction caused per unit wavelength D: size of a single pixel α: maximum angle among angles formed between the normal at the surface of the photosensitive member and the laser beams in the main-scanning direction R: radius of the photosensitive member.

In this case, preferably, $\lambda_1$ and $\lambda_m$ satisfy the following expression:

$$-1 \le \lambda_1 - \lambda_m \le 3 \text{ (unit: nm)}.$$

In the multi-beam scanning optical system according to the above-described third and fourth aspect of the present invention, the scanning optical unit may include at least one diffractive optical element.

In addition, the multi-beam scanning optical system according to the above-described third and fourth aspect of the present invention may further include a synchronization position detection unit in which parts of the laser beams deflected by the deflecting unit are directed to a synchronization detection element by a synchronization detection lens, and which controls the time at scanning start position on the surface of the photosensitive member by using a signal obtained from the synchronization detection element. The synchronization detection lens is disposed in such a manner that the synchronization detection lens is centered and untilted relative to a light path from the deflecting unit to the synchronization detection element.

According to a fifth aspect of the present invention, a multi-beam scanning optical system includes a plurality of light sources; a deflecting unit which deflects a plurality of laser beams emitted from the light sources; and a scanning optical unit which focuses the laser beams deflected by the deflecting unit onto the surface of a photosensitive member. A dot displacement direction in a main-scanning direction due to a difference in light path lengths of the laser beams is opposite to a dot displacement direction in the main-scanning direction due to a difference in wavelengths of the laser beams.

In this case, preferably, the dot displacement in the main-scanning direction due to the difference in light path lengths of the laser beams and the dot displacement in the main-scanning direction due to the difference in wavelengths of the laser beams counterbalance each other.

In addition, according to the present invention, an image forming apparatus includes the multi-beam scanning optical system of the present invention; a photosensitive member disposed on a scan surface; a developing unit which develops an electrostatic latent image formed on the photosensitive member as a toner image, the electrostatic latent image being formed by the laser beams which are emitted from the multi-beam scanning optical system and which scan over the photosensitive member; a transfer unit which transfers the toner image developed by the developing unit onto a transfer medium; and a fixing unit which fixes the toner image transferred by the transfer unit on the transfer medium.

In addition, according to the present invention, an image forming apparatus includes the multi-beam scanning optical system of the present invention; and a printer controller which converts code data obtained from an external device into an image signal and inputs the image signal to the multi-beam scanning optical system.

Thus, according to the present invention, the dot displacement in the main-scanning direction due to the difference in light path lengths of the laser beams and the dot displacement in the main-scanning direction due to the difference in wavelengths of the light sources counterbalance each other, so that the difference in overall magnifications can be corrected. Accordingly, a multi-beam scanning optical system which performs high-quality printing by reducing the dot displacement in the main-scanning direction and an image forming apparatus using the multi-beam scanning optical system can be provided.

Further objects, features and advantages of the present invention will become apparent from the following description of the preferred embodiments with reference to the attached drawings.

DESCRIPTION OF THE PREFERRED EMBODIMENTS

First Embodiment

Figure 1:
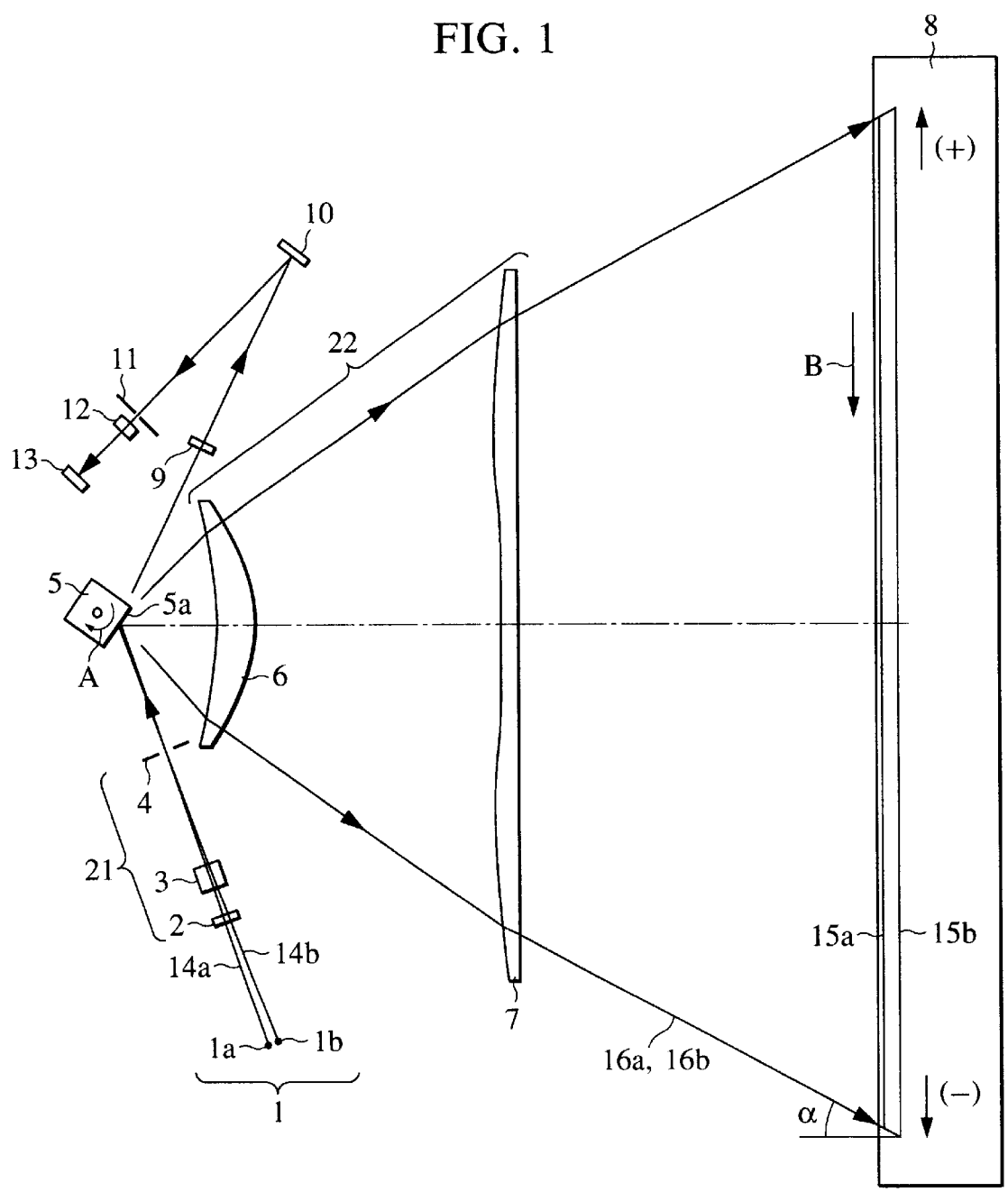
FIG. 1 is a sectional view of the main part of a multi-beam scanning optical system according to a first embodiment of the present invention cut along the main-scanning direction (main-scanning sectional view).
Figure 2:
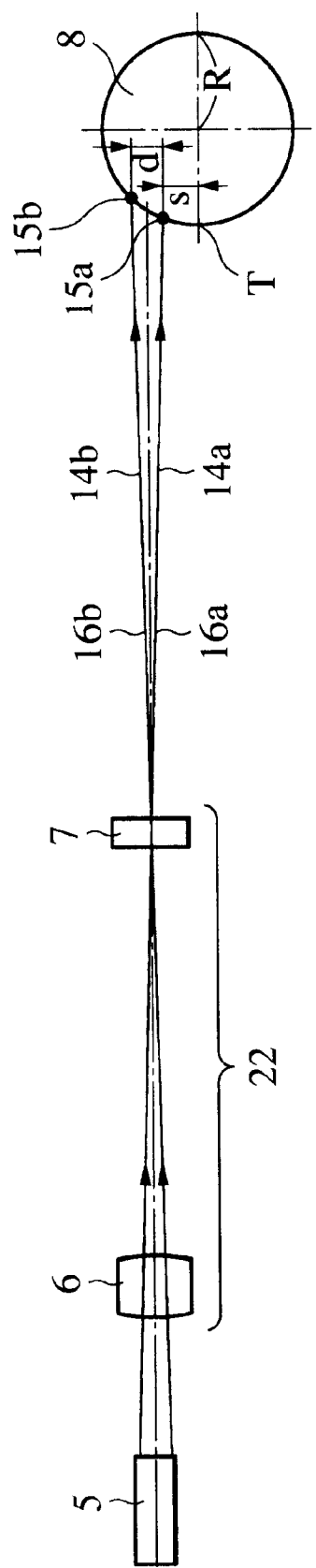
FIG. 2 is a sectional view of the main part of the multi-beam scanning optical system shown in FIG. 1 cut along the sub-scanning direction (sub-scanning sectional view).

FIG. 1 is a sectional view of the main part of a multi-beam scanning optical system according to a first embodiment of the present invention cut along the main-scanning direction (main-scanning sectional view), and FIG. 2 is a sectional view of the main part of the multi-beam scanning optical system shown in FIG. 1 cut along the sub-scanning direction (sub-scanning sectional view).

In the present specification, "main-scanning cross section" refers to a plane which includes an optical axis of a scanning optical unit and laser beams deflected by a deflector, and "sub-scanning cross section" refers to a plane which includes the optical axis of the scanning optical unit and which is perpendicular to the main-scanning cross section.

In FIGS. 1 and 2, a light source unit 1 includes two light sources (laser beam sources) 1a and 1b formed of, for example, semiconductor lasers. The two light sources 1a and 1b are positioned separately from each other in both the main-scanning direction and the sub-scanning direction.

A collimator lens 2 collimates two laser beams 14a and 14b emitted by the light source unit 1, and a cylindrical lens 3 has a predetermined refractive power only in the sub-scanning direction. In addition, an aperture diaphragm 4 forms the two laser beams 14a and 14b emitted from the cylindrical lens 3 into optimal shapes.

The collimator lens 2, the cylindrical lens 3, and the aperture diaphragm 4 form one element of an incident optical unit 21.

A deflector 5 serves as a deflecting unit, and is formed of, for example, a rotating polygon mirror. The deflector 5 is rotated in the direction shown by the arrow A at a constant speed by a driving unit (not shown) such as a motor, etc.

A scanning optical unit 22 has fθ characteristics and includes a toric lens 6 and a diffractive optical element 7. The two laser beams 14a and 14b deflected by the deflector 5 are focused onto the surface of a photosensitive member 8 (scan surface) by the scanning optical unit 22 in the shape of spots, so that two scanning lines 15a and 15b are formed. The scanning optical unit 22 is constructed such that a deflecting surface 5a of the deflector 5 and the surface of the photosensitive member 8 are conjugate to each other in the sub-scanning cross section, so that surface tilting is corrected.

The photosensitive member (photosensitive drum) 8 has an approximately cylindrical shape, and serves as a recording medium.

A synchronization detection lens 9 serves to focus (condense) the two light beams (BD light beams) used for synchronization detection on a slit 11 provided at a position close to a synchronization detection element (BD sensor) 13, which will be described below. The synchronization detection lens 9 is disposed in such a manner that the synchronization detection lens 9 is centered and untilted relative to a light path from the polygon mirror 5 to the BD sensor 13, which will be described below. The synchronization detection lens 9 used in the first embodiment may be formed integrally with the toric lens 6, which is a component of the scanning optical unit 22.

A reflecting mirror 10 (hereinafter referred to as a "BD mirror") reflects the two BD light beams, which are used for adjusting the time at the scanning start positions on the surface of the photosensitive member 8, toward the synchronization detection element 13, which will be described below.

A slit 11 (hereinafter referred to as a "BD slit") for the synchronization detection is disposed at a position optically equivalent to the surface of the photosensitive member 8, and serves to determine the start positions for the image recording.

A correction lens 12 (hereinafter referred to as "BD lens") for the synchronization detection serves to make the BD mirror 10 and the synchronization detection element 13 conjugate to each other, so that the surface tilting of the BD mirror 10 is corrected.

A light sensor 13 (hereinafter referred to as "BD sensor") serves as the synchronization detection lens element. In the first embodiment, the time at the scanning start positions for recording an image on the surface of the photosensitive member 8 is adjusted on the basis of a synchronization signal (BD signal) obtained by detecting an output signal from the BD sensor 13.

The synchronization detection lens 9, the BD mirror 10, the BD slit 11, the BD lens 12, the BD sensor 13, etc., form one element of a synchronization position detection unit (BD optical system).

The laser beams 14a and 14b are emitted from the light sources 1a and 1b, travel along light paths 16a and 16b, and form the scanning lines 15a and 15b, respectively.

In the first embodiment, the two laser beams 14a and 14b, which are optically modulated in accordance with image information, are emitted from the light source unit 1, collimated by the collimator lens 2, and incident on the cylindrical lens 3. The two laser beams 14a and 14b incident on the cylindrical lens 3 leave the cylindrical lens 3 without a change in the main-scanning cross section, and pass through the aperture diaphragm 4 (a part of each laser beam is blocked). In the sub-scanning cross section, the two laser beams 14a and 14b converge before they pass through the aperture diaphragm 4 (a part of each laser beam is blocked). Accordingly, the two laser beams 14a and 14b are focused onto the deflecting surface 5a of the deflector 5 in the shape of lines (lines that extend in the main-scanning direction). Then, the two laser beams 14a and 14b are deflected by the deflecting surface 5a of the deflector 5 and focused onto the surface of the photosensitive member 8 by the scanning optical unit 22 in the shape of spots. By rotating the deflector 5 in the direction shown by the arrow A, the two laser beams 14a and 14b scan over the surface of the photosensitive member 8 in the direction shown by the arrow B (in the main-scanning direction) at a constant speed. Accordingly, the two scanning lines 15a and 15b are simultaneously formed on the surface of the photosensitive member 8 which serves as a recording medium, and an image is recorded on the surface of the photosensitive member 8.

The time at the scanning start positions on the surface of the photosensitive member 8 must be determined before the two laser beams 14a and 14b start scanning over the surface of the photosensitive member 8. Accordingly, parts of the two laser beams 14a and 14b deflected by the deflector 5 are condensed on the surface of the BD slit 11 via the BD mirror 10 by the synchronization detection lens 9 and are directed to the BD sensor 13 via the BD lens 12. The time at the scanning start positions for recording an image on the surface of the photosensitive member 8 is adjusted for each of the BD light beams on the basis of the synchronization signal (BD signal) obtained by detecting the output signal from the BD sensor 13.

Although FIGS. 1 and 2 show a two-scanning optical system including two light sources for convenience, three or more light sources may be used. In addition, in order to facilitate the understanding, only the main laser beams are shown in FIGS. 1 and 2.

Dot Displacement in the Main-scanning Direction Due to Difference in Light Path Lengths The dot displacement in the main-scanning direction due to the difference in lengths of the light paths along which the two laser beams 14a and 14b, which form the two scanning lines 15a and 15b, respectively, travel will be described below.

The two laser beams 14a and 14b are deflected by the polygon mirror 5, travel along the light paths 16a and 16b shown in FIG. 2, and are focused onto the surface of the photosensitive member 8.

The gap d between the two laser beams 14a and 14b on the surface of the photosensitive member 8 in the sub-scanning direction is determined by the size of a single pixel according to an image-forming apparatus in which the system of the first embodiment is mounted. For example, when the resolution is 600 dpi, d is determined as 42.3 μm. The two laser beams 14a and 14b must be incident on the surface of the photosensitive member 8 having the cylindrical shape at positions displaced from the end point T of the photosensitive member 8 in the sub-scanning direction. As described above, this is because the laser beams 14a and 14b must be prevented from returning to the semiconductor lasers and causing noise, so that the optical outputs of the semiconductor lasers do not vary.

However, in such a case, as is apparent from FIG. 2, the lengths of the light paths 16a and 16b along which the laser beams 14a and 14b travel differ by ΔL, which is calculated as follows:

$$\Delta L = \sqrt{R^2 - (S+d)^2} - \sqrt{R^2 - S^2} \quad (1)$$

wherein,

R: radius of the photosensitive member

S: displacement of the position at which the laser beam 14a is incident on the surface of the photosensitive member 8 from the end point T (distance between the scanning line 15a and the end point T on the surface of the photosensitive member 8 in the sub-scanning direction)

d: gap between the two scanning lines 15a and 15b (distance between the two scanning lines 15a and 15b on the surface of the photosensitive member 8 in the sub-scanning direction).

In the first embodiment, the above-described parameters are set as follows:

| | |
|---|---|
| Radius of photosensitive member | R = 15 mm |
| Gap between scanning lines | d = 42.3 μm (600 dpi) |
| Displacement of laser beam | S = 2.5 mm. |

Figure 3:
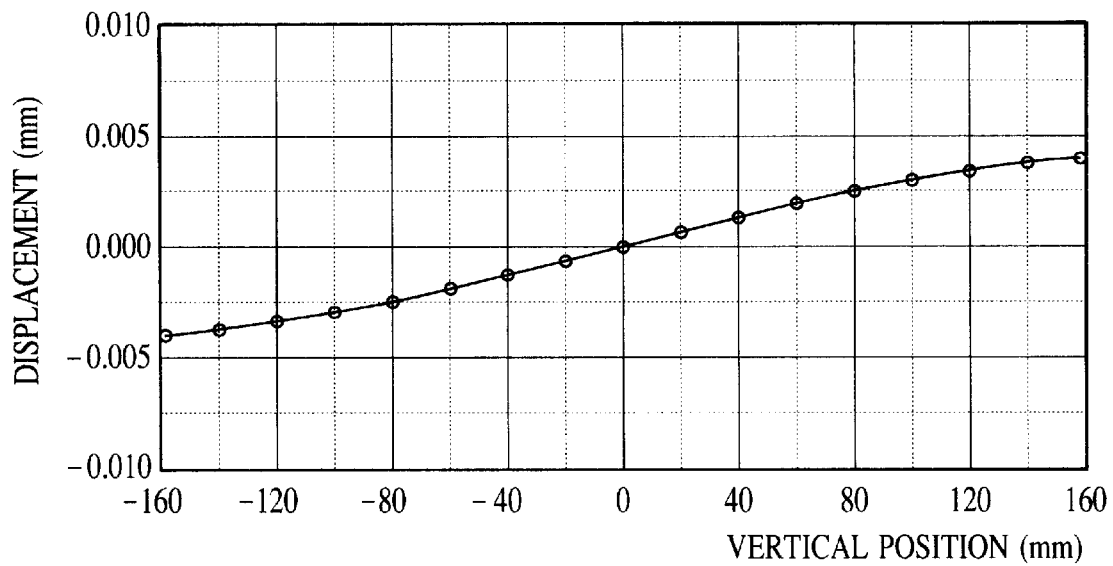
FIG. 3 is a graph showing the dot displacement due to the difference in light path lengths according to the first embodiment.

FIG. 3 is a graph showing the dot displacement in the main-scanning direction due to the difference in light path lengths according to the first embodiment. In FIG. 3, the solid line shows the displacement between the dot on the scanning line 15b relative to the dot on the scanning line 15a.

With reference to FIG. 3, the magnification in the main-scanning direction of the scanning line 15b is larger than that of the scanning line 15a. Accordingly, the dots formed on the scanning line 15a and the dots formed on the scanning line 15b are displaced from each other.

When the displacement at one end of the scanning lines 15a and 15b is determined as $\Delta Y_L$ and the displacement at the other end is determined as $\Delta Y_R$, the displacements $\Delta Y_L$ and $\Delta Y_R$ can be calculated as Expression (2). As shown in FIG. 3, the amount of dot displacement is 0 when the image height is 0, is increased along with the image height, and is a maximum at both ends.

$$\Delta Y_L = \Delta L \tan \alpha_L$$

$$\Delta Y_R = \Delta L \tan \Delta_R \quad (2)$$

wherein $\alpha_L$ is an angle between the normal at the surface of the photosensitive member 8 and the laser beams 14a and 14b in the main-scanning direction at one end in the main-scanning direction, and $\alpha_R$ is an angle between the normal at the surface of the photosensitive member 8 and the laser beams 14a and 14b in the main-scanning direction at the other end in the main-scanning direction.

In FIG. 3, the signs in the vertical axis show whether the dots on the scanning line 15b are at the right side or the left side relative to the dots on the scanning line 15a, and the signs in FIG. 3 indicate the same directions as the signs shown in FIG. 1.

Dot Displacement in the Main-scanning Direction Due to Difference in Wavelengths Next, the dot displacement in the main-scanning direction due to the difference in oscillation wavelengths of the two light sources 1a and 1b will be described below.

In the first embodiment, in order to correct the dot displacement in the main-scanning direction due to the difference in light path lengths of the laser beams, the toric lens 6 and the diffractive optical element 7 are used as the scanning optical elements, and are set such that the lateral chromatic aberration is overcorrected.

Overcorrection of the lateral chromatic aberration means that the magnification is reduced when the wavelength exceeds a reference wavelength. This is the opposite to the chromatic difference caused by a single normal convex lens.

Figure 4:
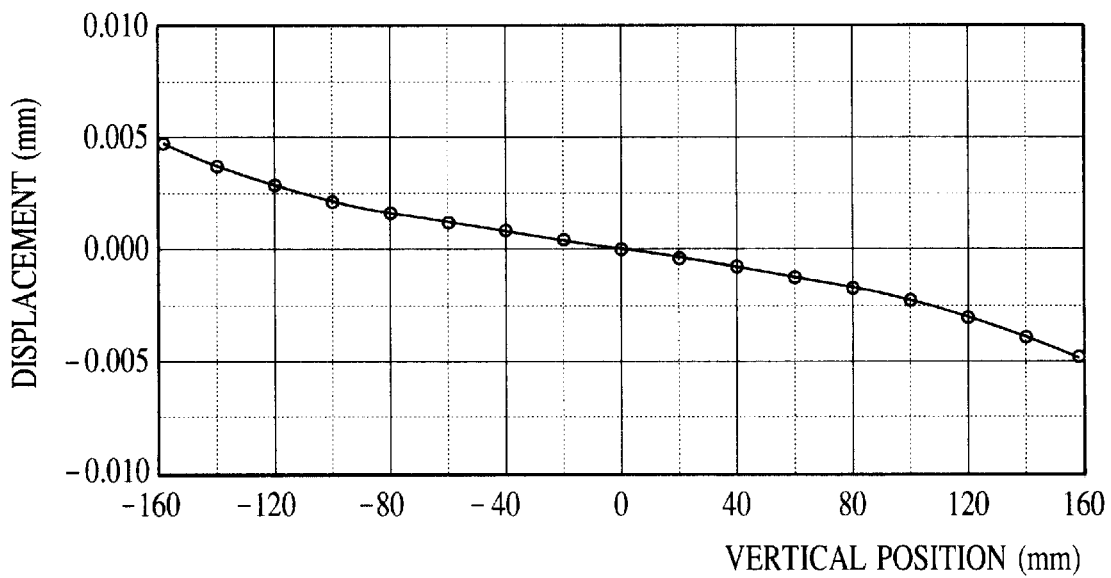
FIG. 4 is a graph showing the dot displacement due to the lateral chromatic aberration of the scanning optical unit according to the first embodiment.

FIG. 4 is a graph showing the dot displacement in the main-scanning direction due to the lateral chromatic aberration of the scanning optical unit 22 caused per unit wavelength (1 nm) of laser beams according to the first embodiment.

In FIG. 4, the solid line shows the dot displacement caused when the wavelength is increased by 1 nm relative to the reference wavelength (780 nm). The amount of dot displacement is 0 at the center of the image, is increased along with the image height, and is a maximum at both ends.

The reason why the dot displacement is 0 at the center of the image when the wavelength is changed is because the synchronization detection lens 9 is disposed in such a manner that the synchronization detection lens 9 is centered and untilted relative to the light path, so that the lateral chromatic aberration at the center of the image area and at the BD optical system is corrected.

In the first embodiment, the dot displacement in the main-scanning direction due to the difference in light path lengths of the laser beams is corrected by the dot displacement in the main-scanning direction due to the difference in wavelengths. In order to achieve this, among the angles formed between each laser beam incident on the surface of the photosensitive member 8 and the normal at the surface of the photosensitive member 8 in the sub-scanning direction, the oscillation wavelength of the light source that emits a laser beam forming the minimum angle is set to a value smaller than the oscillation wavelength of the light source that emits a laser beam forming the maximum angle. Thus, the oscillation wavelength of the light source 1a which emits the laser beam 14a forming the smaller angle is set to a value smaller than the oscillation wavelength of the light source 1b which emits the laser beam 14b forming the larger angle. More specifically, the wavelengths of the light sources 1a and 1b are set as follows:

Oscillation wavelength of light source 1a: 780 nm

Oscillation wavelength of light source 1b: 781 nm

Figure 5:
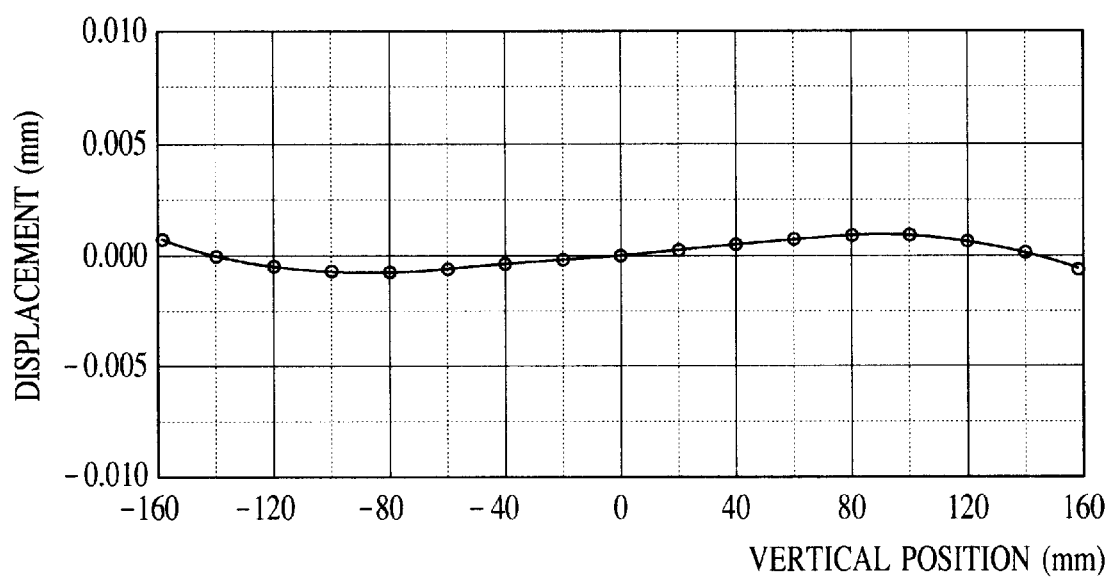
FIG. 5 is a graph showing the remaining dot displacement according to the first embodiment.

In this case, the amount of dot displacement in the main-scanning direction due to the difference in light path lengths and the amount of dot displacement in the main-scanning direction due to the difference in wavelengths of the light sources are almost the same and the signs thereof are opposite. Thus, as shown in FIG. 5, the dot displacements in the main-scanning direction due to the above-described two reasons almost completely counterbalance each other. Accordingly, the dot displacement in the main-scanning direction can be corrected over the entire region of the image area.

Table 1 shows optical design parameters according to the first embodiment. Equations for expressing the shapes of the optical elements will be described below.

Refracting Surface: A refracting surface is defined as an aspheric surface whose shape in the main-scanning direction can be expressed by a tenth-order function or less. When the intersection of the refracting surface and the optical axis is the origin, the optical axis is the x axis, the axis which extend perpendicularly to the optical axis in the main-scanning cross section is the y axis, and the axis which extend perpendicularly to the optical axis in the sub-scanning cross section is the z axis, the shape of the refracting surface along the direction corresponding to the main-scanning direction is expressed as follows:

$$x = \frac{Y^2/R}{1+\{1-(1+K)(Y/R)^2\}^{1/2}} + B_4Y^4 + B_6Y^6 + B_8Y^8 + B_{10}Y^{10} \tag{3}$$

wherein R is the radius of curvature and K, $B_4$, $B_6$, $B_8$, and $B_{10}$ are aspheric coefficients.

In addition, the shape of the refracting surface along the direction corresponding to the sub-scanning direction (the direction which includes the optical axis and is perpendicular to the main-scanning direction), is expressed as follows:

$$S = \frac{Z^2/r'}{1+\{1-(Z/r')^2\}^{1/2}} \tag{4}$$

wherein $r'=r_0(1+D_2Y^2+D_4Y^4+D_6Y^6+D_8Y^8+D_{10}Y^{10})$, $r_0$ is the radius of curvature on the optical axis, and $D_2$, $D_4$, $D_6$, $D_8$, and $D_{10}$ are coefficients.

Diffraction Surface: A diffraction surface is defined as a surface whose shape in the main-scanning direction can be expressed by a sixth-order function or less and the shape in the sub-scanning direction can be expressed by a second-order phase function which differs in accordance with the position in the main-scanning direction.

$$\phi = m\lambda = b_2Y^2 + b_4Y^4 + b_6Y^6 + (d_0+d_1Y+d_2Y^2+d_3Y^3)Z^2 \tag{5}$$

wherein m is the diffraction, which is +1 in the first embodiment.

TABLE 1

| Wavelength and Refractive Index | | | Design Data | | | | |
|---|---|---|---|---|---|---|---|
| | | | Shape of Toric Lens 6 | | | | |
| Wavelength | λ (nm) | 780 | First Surface | Second Surface | | First Surface | Second Surface |
| | | | | | | Shape of Diffractive element 7 | |
| Refractive Index of Toric Lens 6 | nd t | 1.53064 | R −8.37256E+01 | −4.46398E+01 | R | −3.27422E+02 | ∞ |
| Abbe Number of Toric Lens 6 | v d t | 55.5 | K −8.85666E+00 | −5.33951E−01 | K | −8.52087E+01 | |
| Refractive Index of Diffractive element 7 | nd d | 1.53064 | $B_4$ 9.81713E−07 | 1.65579E−06 | $B_4$ | 1.59236E−07 | |
| Abbe Number of Diffractive element 7 | v d d | 55.5 | $B_6$ −5.17945E−11 | 3.79299E−10 | $B_6$ | −1.10765E−11 | |
| Angle of Laser Beam | | | r 1.25787E+02 | −2.33970E+01 | $B_8$ | 3.70722E−16 | |
| Angle of Laser Beam Incident on Polygon | θp | −70.0 | $D_{2s}$ | 1.42600E−04 | $B_{10}$ | −4.86087E−21 | |

TABLE 1-continued

Design Data

| Wavelength and Refractive Index Wavelength | λ (nm) | 780 | Shape of Toric Lens 6 | | | |
|---|---|---|---|---|---|---|
| | | | First Surface | Second Surface | First Surface | Second Surface |
| Maximum Angle of Laser Beam Leaving Polygon | θe | 45.0 | $D_{4s}$ | 5.10858E−08 | Phase Function of Diffractive element 7 | |
| | | | $D_{6s}$ | 3.98672E−13 | | |
| Arrangement | | | $D_{2e}$ | 2.14316E−04 | $b_2$ | −1.72316E−04 |
| Polygon Surface-Toric Lens | e1 | 30.0 | $D_{4e}$ | −1.22319E−08 | $b_4$ | 1.61040E−09 |
| Thickness of Toric Lens at Center | d1 | 11.0 | $D_{6e}$ | 3.61202E−11 | $b_6$ | −1.12978E−13 |
| Toric lens-Diffractive element | e2 | 75.0 | Subscript "s" shows the side close to the laser, and "e" shows the side opposite to the laser. Sign "+" in the Y axis shows the side opposite to the laser. | | $d_0$ | −5.10910E−03 |
| Thickness of Diffractive element at Center | d2 | 4.0 | | | $d_1$ | 1.35226E−06 |
| Diffractive element-Scan surface | Sk | 110.0 | | | $d_2$ | 6.65427E−08 |
| Polygon Axis-Scan Surface | L | 230.0 | | | $d_3$ | −6.20669E−11 |
| Effective Scan Width | W | 297.0 | | | $d_4$ | 1.01220E−12 |

As described above, in the first embodiment, the dot displacement in the main-scanning direction due to the difference in light path lengths of the laser beams and the dot displacement in the main-scanning direction due to the difference in wavelengths of the light sources counterbalance each other. Accordingly, the dot displacement is made almost 0 over the entire image area, so that an extremely high-quality multi-beam scanning optical system can be obtained.

Second Embodiment

Next, a second embodiment will be described below.

The second embodiment differs from the above-described first embodiment in that the difference between the wavelengths of the two light sources 1a and 1b is limited such that the dot displacement in the main-scanning direction is made small enough to be indiscernible over the entire image area. Other constructions and optical operations of the second embodiment are almost the same as those in the first embodiment, and effects similar to those obtained in the first embodiment can also be obtained in the second embodiment.

When the oscillation wavelengths of the two light sources 1a and 1b are set as described above in the first embodiment, an extremely high-quality multi-beam scanning optical system can be obtained.

However, since the oscillation wavelengths of semiconductor lasers generally include manufacturing errors, it is difficult to manufacture all the semiconductor lasers in optimum conditions. Although the oscillation wavelengths of semiconductor lasers are determined by the compositions thereof, they vary due to manufacturing errors, etc. Accordingly, in multi-beam lasers in which a plurality of light sources are formed on a single chip, the oscillation wavelengths of two adjacent light sources may differ by a maximum of approximately 2 nm.

In the second embodiment, the difference between the wavelengths of the two light sources 1a and 1b is limited such that the dot displacement in the main-scanning direction is made small enough to be indiscernible over the entire image area. Accordingly, a more practical multi-beam scanning optical system can be provided. A scanning optical unit used in the second embodiment is the same as that used in the first embodiment.

In color-image forming apparatuses which output halftone images such as color laser printers, etc., if the allowable value of the dot displacement is set to one-fourth of the size of a single pixel, the dot displacement is indiscernible and the quality of the image can be ensured. Accordingly, in the second embodiment, settings are made such that the following expression is satisfied.

$$|\Delta Y_1 - \Delta Y_2(\lambda_b - \lambda_a)| \leq \frac{D}{4} \quad (6)$$

wherein, $\Delta Y_1$: the larger of $\Delta Y_L$ and $\Delta Y_R$ calculated by Expression (2)

$\Delta Y_2$: dot displacement in the main-scanning direction at the end in the main-scanning direction caused per unit wavelength $\lambda_a$ and $\lambda_b$: oscillation wavelengths of the light sources 1a and 1b, respectively D: size of a single pixel (42.3 μm when the resolution is 600 dpi).

When the design parameters of the second embodiment are assigned, D/4 can be calculated as 10 μm. Accordingly, in order to satisfy Expression (6), $\lambda_a$ and $\lambda_b$, that is, the oscillation wavelengths of the light sources 1a and 1b, must satisfy the following expression:

$$-1 \leq \lambda_b - \lambda_a \leq 3 \text{ (unit: nm)} \quad (7)$$

In the foregoing descriptions, a two-beam laser scanning optical system including two light sources was described. Next, an n-beam laser scanning optical system including n light sources for forming n scanning lines will be described below. In this case, it can be easily understood that Expression (6) must be satisfied for each of the n light sources.

In the n-beam laser scanning optical system, when the oscillation wavelength of the light source which emits the light beam forming the first scanning line is defined as $\lambda_1$ and the oscillation wavelength of the light source which emits the light beam forming the $m^{th}$ scanning line (1<m≦n) is defined as $\lambda_m$, Expressions (1), (2), and (6) can be changed to Expression (8), which is shown below.

As shown in FIG. 2, the first scanning line is formed on the surface of the photosensitive member 8 at a position displaced from the end point T of the photosensitive member 8 by the distance S in the sub-scanning direction. In addition, the $m^{th}$ scanning line (1<m≦n) is formed on the surface of the photosensitive member 8 at a position displaced from the end point T by the distance (S+d) in the sub-scanning direction.

$$|\Delta Y_1 - \Delta Y_2(\lambda_m - \lambda_1)| \leq \frac{D}{4} \quad (8)$$

$$\Delta Y_1 = \Delta L \tan\alpha$$

$$\Delta L = \sqrt{R^2 - (S+d)^2} - \sqrt{R^2 - S^2}$$

wherein, $\Delta Y_2$: dot displacement in the main-scanning direction at the end in the main-scanning direction caused per unit wavelength D: size of a single pixel α: maximum angle among angles formed between the normal at the surface of the photosensitive member and the laser beams in the main-scanning direction R: radius of the photosensitive member.

In addition, Expression (7) can be changed by replacing $\lambda_2$ with $\lambda_m$ as follows:

$$-1 \leq \lambda_m - \lambda_1 \leq 3 \text{ (unit: nm)} \quad (9)$$

In Expression (8), R, S, and d are the same as those explained above in relation to Expression (1).

In the second embodiment, Expressions (8) and (9) are satisfied in the n-beam laser scanning optical system and the allowable value of the dot displacement is set to one-fourth of the size of a single pixel, so that the quality of the image is ensured.

Accordingly, in the second embodiment, settings are made such that Expressions (8) and (9) are satisfied. In this way, the dot displacement in the main-scanning direction due to the difference in light path lengths of the laser beams and the dot displacement in the main-scanning direction due to the difference in wavelengths of the light sources counterbalance each other, and the dot displacement is made small enough to be indiscernible over the entire image area. Accordingly, a high-quality multi-beam scanning optical system can be obtained.

Third Embodiment

Figure 6:
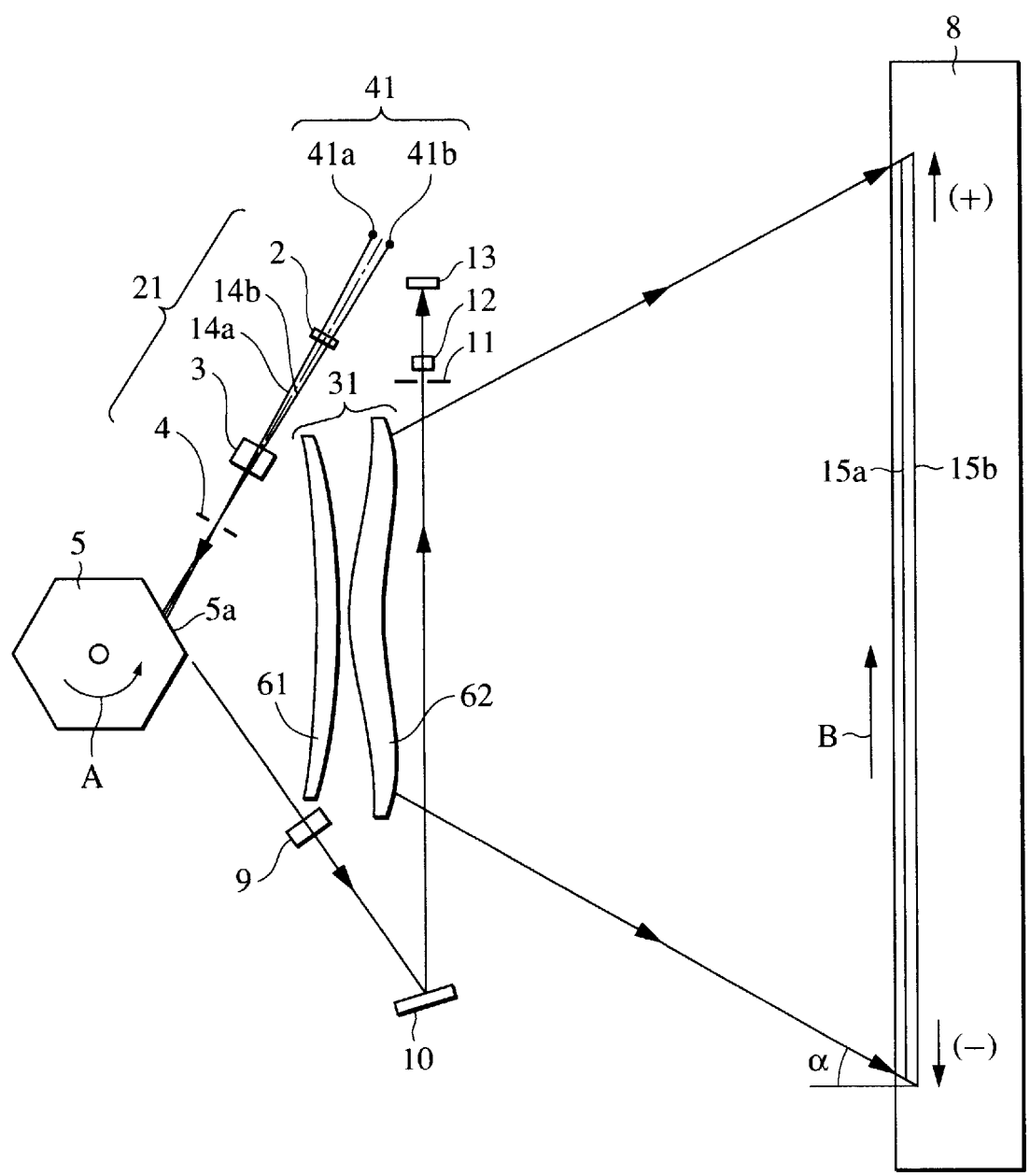
FIG. 6 is a sectional view of the main part of a multi-beam scanning optical system according to a third embodiment of the present invention cut along the main-scanning direction (main-scanning sectional view).
Figure 7:
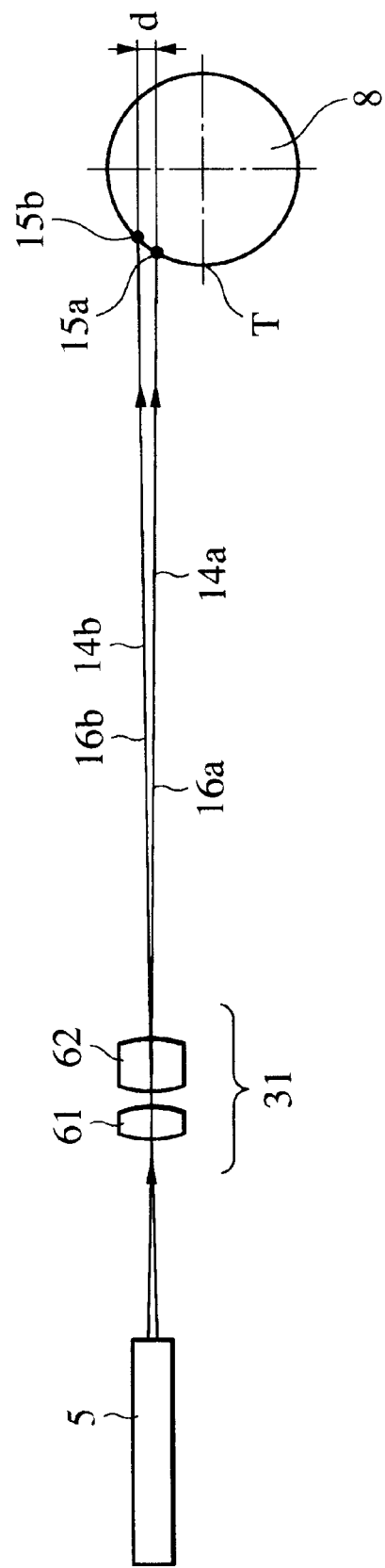
FIG. 7 is a sectional view of the main part of the multi-beam scanning optical system shown in FIG. 6 cut along the sub-scanning direction (sub-scanning sectional view).

FIG. 6 is a sectional view of the main part of a multi-beam scanning optical system according to a third embodiment of the present invention cut along the main-scanning direction (main-scanning sectional view), and FIG. 7 is a sectional view of the main part of the multi-beam scanning optical system shown in FIG. 6 cut along the sub-scanning direction (sub-scanning sectional view). In FIGS. 6 and 7, components similar to those shown in FIGS. 1 and 2 are denoted by the same reference numerals.

The third embodiment differs from the first embodiment in that a scanning optical unit 31 is formed of first and second toric lenses (refractive optical elements) 61 and 62, and that the first and second toric lenses 61 and 62 are set such that the lateral chromatic aberration is not corrected (or undercorrected). In addition, among the angles formed between each laser beam incident on the surface of the photosensitive member and the normal at the surface of the photosensitive member in the sub-scanning direction, the oscillation wavelength of the light source that emits a laser beam forming the minimum angle is set to a value larger than the oscillation wavelength of the light source that emits a laser beam forming the maximum angle. Other constructions and optical operations of the third embodiment are almost the same as those in the first embodiment, and effects similar to those obtained in the first embodiment can also be obtained in the third embodiment.

With reference to FIGS. 6 and 7, the scanning optical unit 31 has fθ characteristics and includes the first and second toric lenses 61 and 62. In the third embodiment, the two toric lenses 61 and 62 are set such that the lateral chromatic aberration is not corrected (or undercorrected). When the lateral chromatic aberration is not corrected (or undercorrected), the magnification is increased when the wavelength exceeds a reference wavelength. This is the same as the chromatic difference caused by a single normal convex lens.

Figure 8:
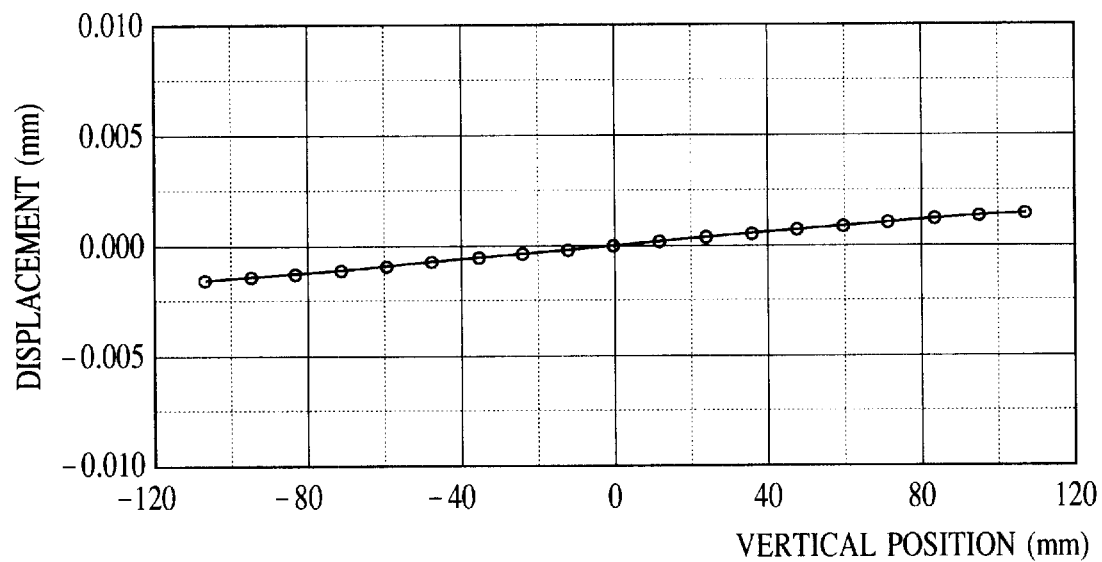
FIG. 8 is a graph showing the dot displacement due to the difference in light path lengths according to the third embodiment.
Figure 9:
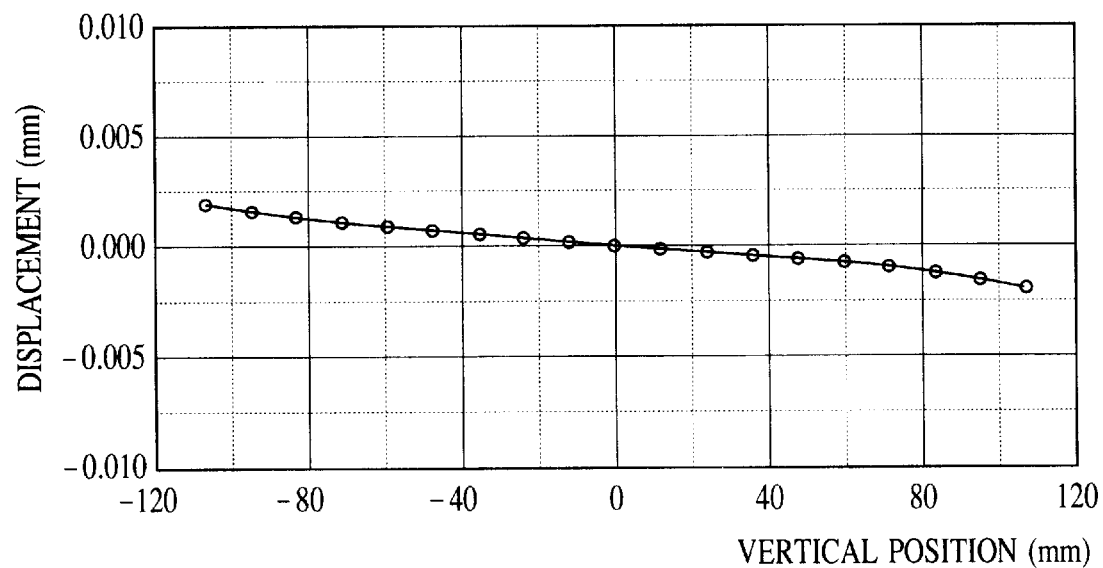
FIG. 9 is a graph showing the dot displacement due to the lateral chromatic aberration of the scanning optical unit according to the first embodiment.

FIG. 8 is a graph showing the dot displacement in the main-scanning direction due to the difference in light path lengths according to the third embodiment, and FIG. 9 is a graph showing the dot displacement in the main-scanning direction due to the lateral chromatic aberration of the scanning optical unit 31 caused per unit wavelength (1 nm) according to the third embodiment.

In the third embodiment, among the angles formed between each laser beam incident on the surface of the photosensitive member 8 and the normal at the surface of the photosensitive member 8 in the sub-scanning direction, the oscillation wavelength of the light source that emits a laser beam forming the minimum angle is set to a value larger than the oscillation wavelength of the light source that emits a laser beam forming the maximum angle. Thus, the oscillation wavelength of the light source 41a which emits the laser beam 14a forming the smaller angle is set to a value larger than the oscillation wavelength of the light source 41b which emits the laser beam 14b forming the larger angle. More specifically, the wavelengths of the light sources 41a and 41b are set as follows:

Oscillation wavelength of light source 41a: 781 nm

Oscillation wavelength of light source 41b: 780 nm

Figure 10:
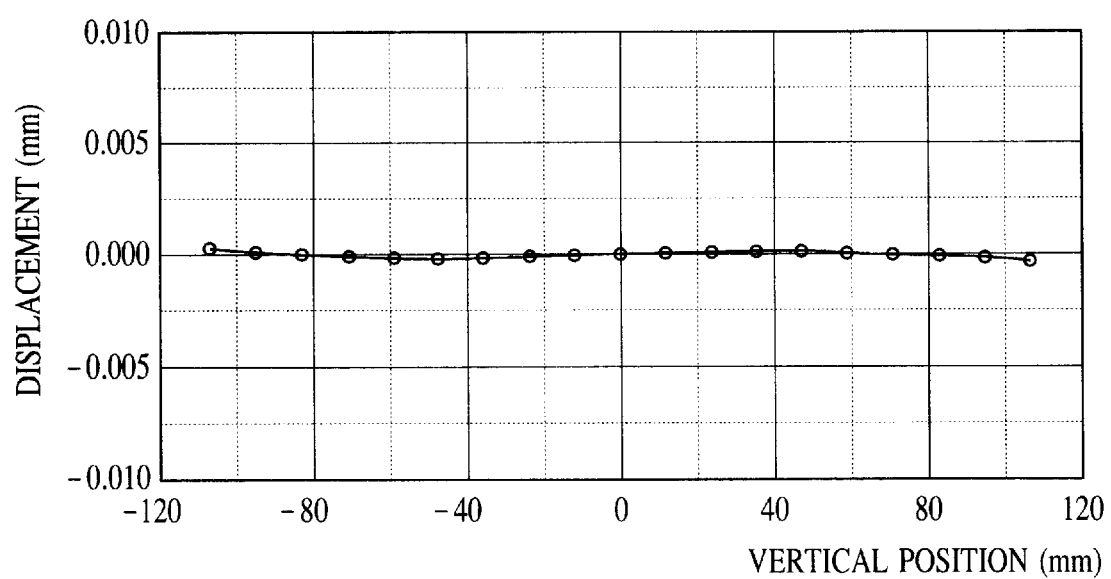
FIG. 10 is a graph showing the remaining dot displacement according to the third embodiment.

In this case, the amount of dot displacement in the main-scanning direction due to the difference in light path lengths and the amount of dot displacement in the main-scanning direction due to the difference in wavelengths of the light sources are almost the same and the signs thereof are opposite. Thus, as shown in FIG. 10, the dot displacements in the main-scanning direction due to the above-described two reasons almost completely counterbalance each other. Accordingly, the dot displacement in the main-scanning direction can be corrected over the entire region of the image area.

In the third embodiment, design parameters for Expression (1) are set as follows.

| | |
|---|---|
| Radius of photosensitive member | R = 15 mm |
| Gap between scanning lines | d = 21.2 μm (1200 dpi) |
| Displacement of laser beam | S = 2.5 mm |

Table 2 shows optical design parameters according to the third embodiment. Equations for expressing the shapes of the optical elements are the same as those used in the first embodiment.

TABLE 2

Design Data

| Wavelength and Refractive Index Wavelength | | λ (nm) | 780 | Shape of Toric Lens 61 | | Shape of Toric Lens 62 | |
|---|---|---|---|---|---|---|---|
| | | | | First Surface | Second Surface | First Surface | Second Surface |
| Refractive Index of Toric Lens 61 | nd t | 1.53064 | | R −6.204E+01 | −3.520E+01 | R 8.820E+01 | 8.670E+01 |
| Abbe Number of Toric Lens 61 | v d t | 55.5 | | K −4.611E+00 | −2.130E+00 | K −5.328E−01 | −1.696E+01 |
| Refractive index of Toric Lens 62 | nd d | 1.53064 | | $B_4$ 2.852E−06 | −4.482E−07 | $B_4$ −4.527E−06 | −3.217E−06 |
| Abbe Number of Toric Lens 62 | v d d | 55.5 | | $B_6$ | 2.061E−09 | $B_6$ 2.280E−09 | 1.395E−09 |
| Angle of Laser Beam | | | | $B_8$ | −2.364E−14 | $B_8$ −7.458E−13 | −3.761E−13 |
| Angle of Laser Beam Incident on Polygon | θp | −60.0 | | $B_{10}$ | | $B_{10}$ 8.424E−17 | 2.166E−17 |
| Maximum Angle of Laser Beam Leaving Polygon Arrangement | θe | 45.0 | | | | | |
| Polygon Surface-Toric Lens 61 | e1 | 24.5 | | | | | |
| Thickness of Toric Lens 61 at Center | d1 | 8.0 | | | | | |
| Toric lens 61-Toric lens 62 | e2 | 15.4 | | | | | |
| Thickness of Toric lens 62 at Center | d2 | 7.0 | | | | | |
| Toric lens 62-Scan surface | Sk | 119.0 | | | | | |
| Effective Scanning Width | W | 210.0 | | | | | |

As described above, in the third embodiment, the scanning optical unit 31 is formed of the two toric lenses 61 and 62, and the dot displacement in the main-scanning direction due to the difference in light path lengths of the laser beams 14a and 14b and the dot displacement in the main-scanning direction due to the difference in wavelengths of the light sources 41a and 41b counterbalance each other. Accordingly, the dot displacement is made almost 0 over the entire image area, so that an extremely high-quality multi-beam scanning optical system can be obtained.

Fourth Embodiment

Next, a fourth embodiment will be described below.

The fourth embodiment differs from the above-described third embodiment in that the difference between the wavelengths of the two light sources 41a and 41b is limited such that the dot displacement in the main-scanning direction is made small enough to be indiscernible over the entire image area. Other constructions and optical operations of the fourth embodiment are almost the same as those in the third embodiment, and effects similar to those obtained in the third embodiment can also be obtained in the fourth embodiment.

As described in the second embodiment, since the oscillation wavelengths of light sources include manufacturing errors, it is difficult to manufacture all the semiconductor lasers in optimum conditions. Although the oscillation wavelengths of semiconductor lasers are determined by the compositions thereof, they vary due to manufacturing errors, etc.

In the fourth embodiment, the difference between the wavelengths of the two light sources 41a and 41b is limited such that the dot displacement in the main-scanning direction is made small enough to be indiscernible over the entire image area. Accordingly, a more practical multi-beam scanning optical system can be provided.

More specifically, in the fourth embodiment, settings are made such that Expression (10), which correspond to the above-described Expression (8) and which is the condition for the dot displacement to be within the allowable range, is satisfied.

$$|\Delta Y_1 - \Delta Y_2 (\lambda_1 - \lambda_m)| \leq \frac{D}{4} \quad (10)$$

$$\Delta Y_1 = \Delta L \tan\alpha$$

$$\Delta L = \sqrt{R^2 - (S+d)^2} - \sqrt{R^2 - S^2}$$

In addition, the difference between the oscillation wavelengths of the two light sources 41a and 41b is set to satisfy the following expression:

$$-1 \leq \lambda_1 - \lambda_m \leq 3 \text{ (unit: nm)} \quad (11)$$

Accordingly, in the fourth embodiment, settings are made such that Expressions (10) and (11) are satisfied. In this way, the dot displacement in the main-scanning direction due to the difference in light path lengths of the laser beams 14a and 14b and the dot displacement in the main-scanning direction due to the difference in wavelengths of the light sources 41a and 41b counterbalance each other, and the dot displacement is made small enough to be indiscernible over the entire image area. Accordingly, a high-quality multi-beam scanning optical system can be obtained.

In the above-described embodiments, the scanning optical unit is formed of a refractive optical element (toric lens) and a diffractive optical element, or of two refractive optical elements. However, the present invention is not limited to this, and the scanning optical unit may also be formed of, for example, three or more optical elements including refractive optical elements and/or diffractive optical elements.

Image-Forming Apparatus

Next, an image-forming apparatus to which the present invention is applied will be described.

Figure 11:
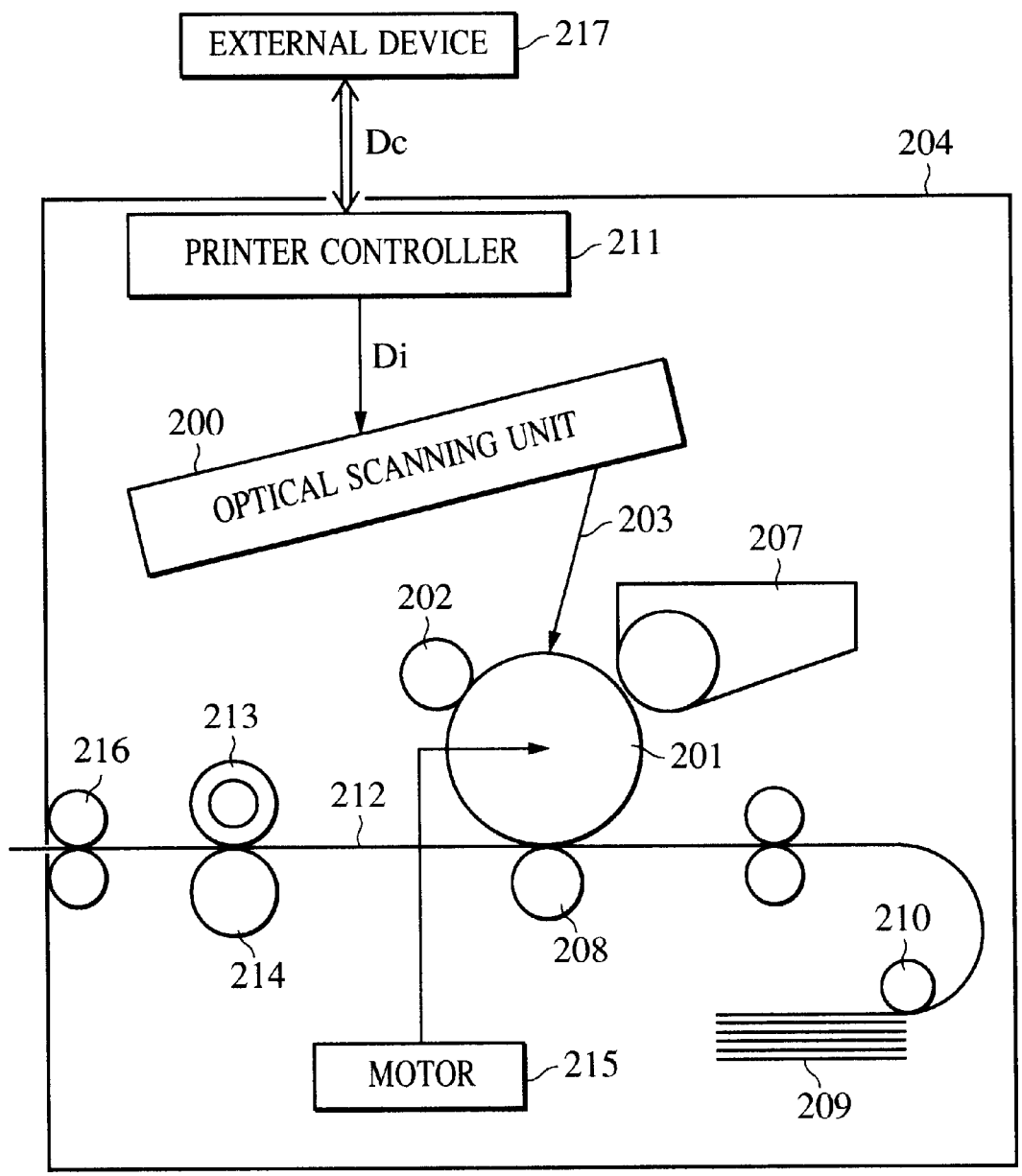
FIG. 11 is a sectional view of the main part of an image forming apparatus according to the present invention.
Figure 12:
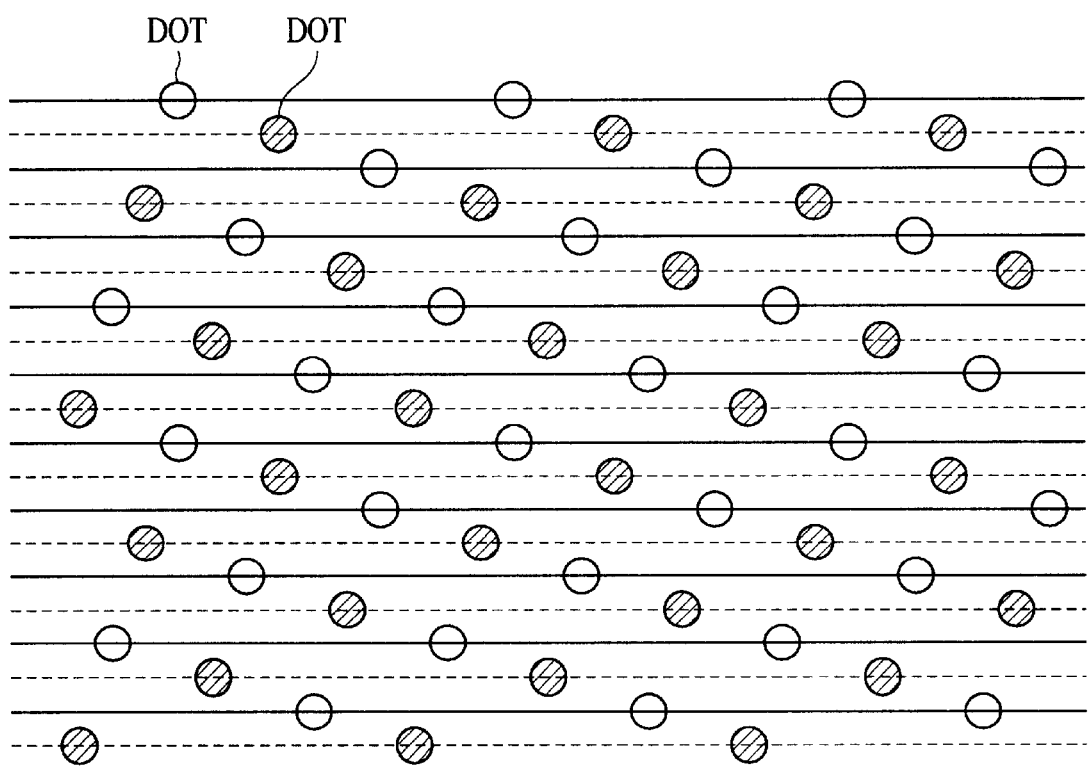
FIG. 12 is a diagram for explaining the affect of the dot displacement in the main-scanning direction to an image.
Figure 13:
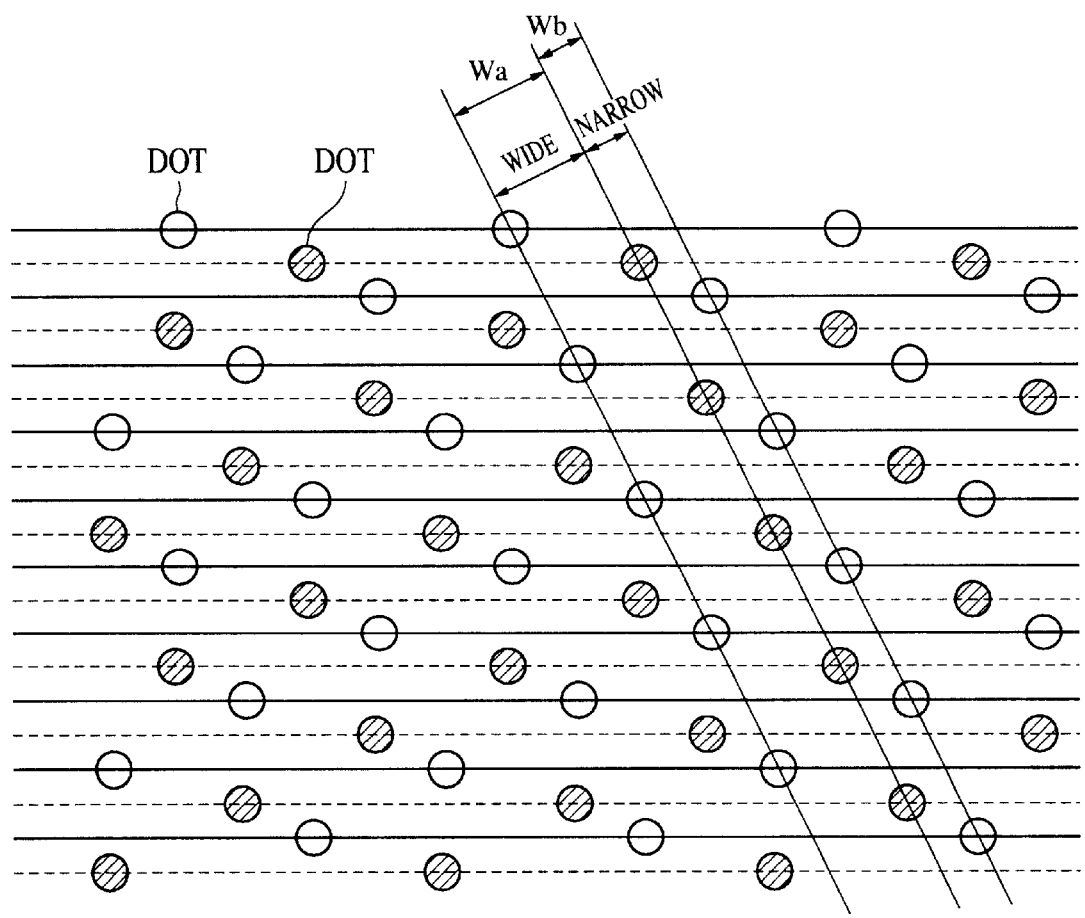
FIG. 13 is a diagram for explaining the affect of the dot displacement in the main-scanning direction to an image.
Figure 14:
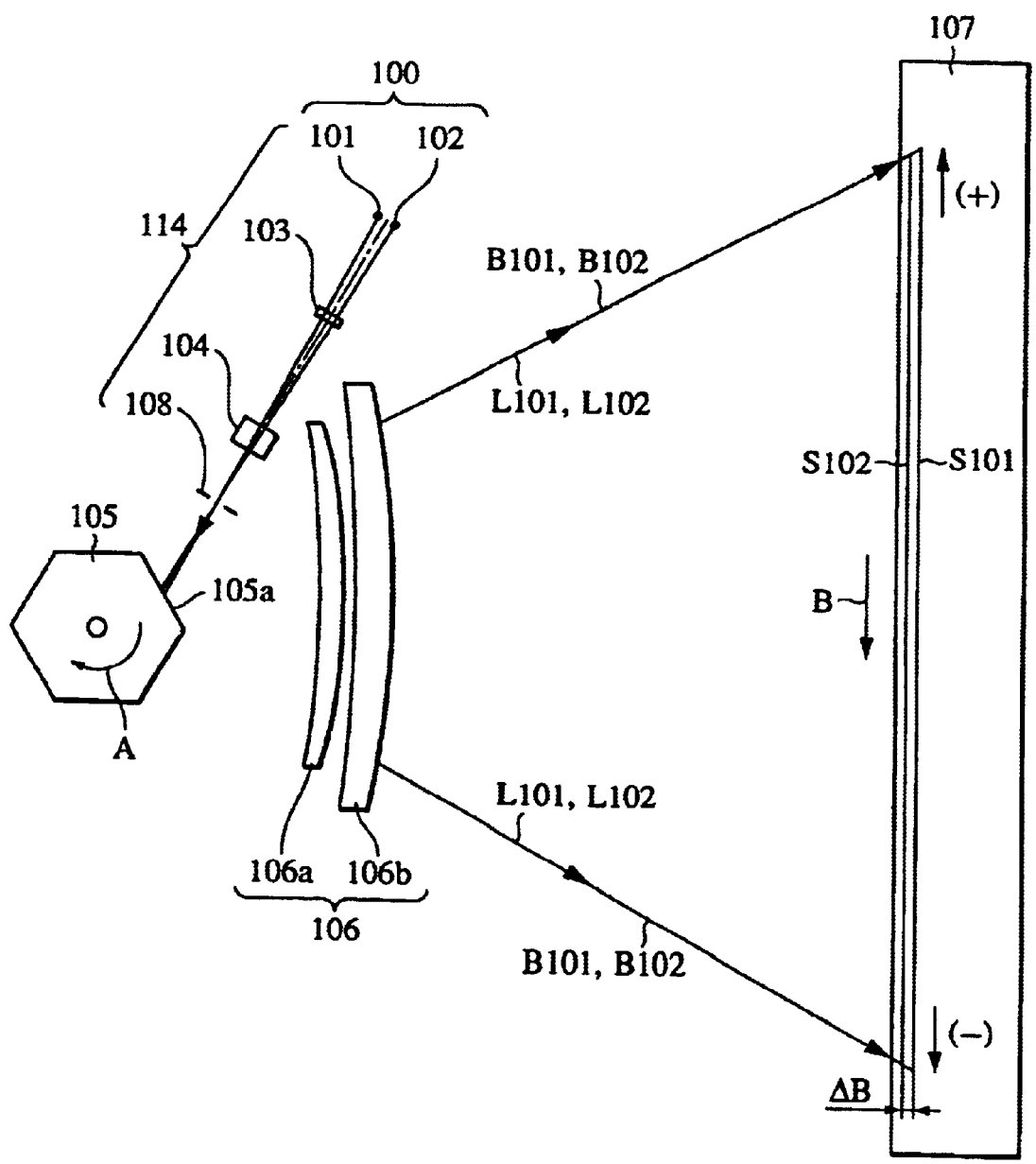
FIG. 14 is a main-scanning sectional view of a multi-beam scanning optical system of the known art.
Figure 15:
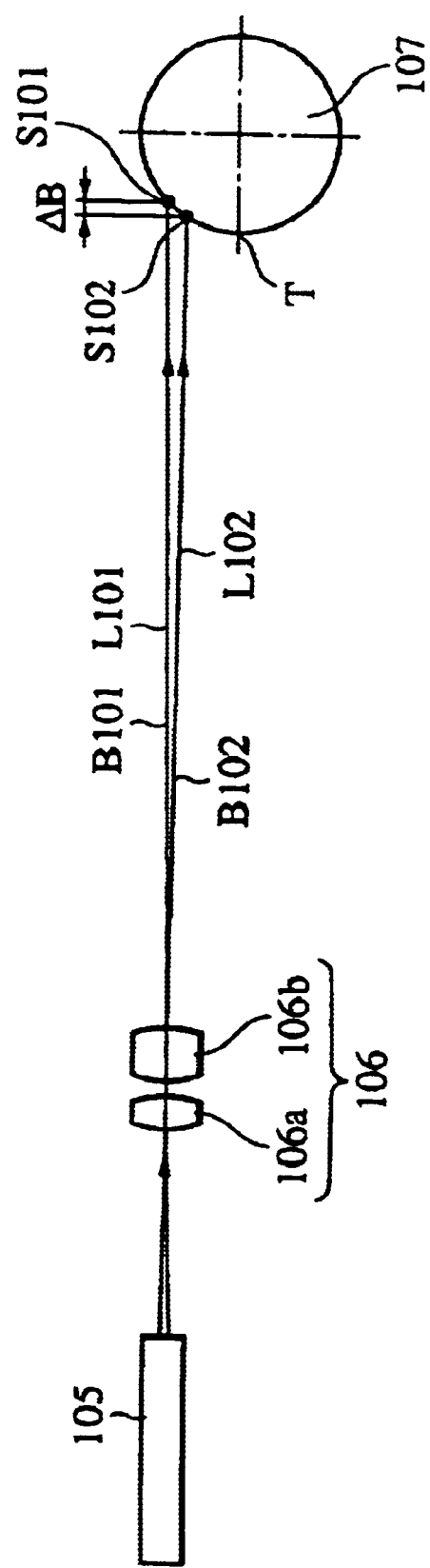
FIG. 15 is a sub-scanning sectional view of the multi-beam scanning optical system of the known art.

FIG. 11 is a sectional view of the main part of an image forming apparatus (electrographic printer) containing a multi-beam scanning optical system according to one of the above-described first to fourth embodiments of the present invention cut along the sub-scanning direction.

In FIG. 11, an image forming apparatus 204 receives code data Dc from an external device 217 such as a personal computer, etc. The code data Dc is converted into image data (dot data) Di by a printer controller 211 installed in the image forming apparatus 204, and the image data Di is input to an optical scanning unit 200. The optical scanning unit (multi-beam scanning optical system) 200 emits a light beam 203 which is modulated in accordance with the image data Di, and the light beam 203 scans the photosensitive surface of a photosensitive member 201 in the main-scanning direction.

The photosensitive member (photosensitive drum) 201, which serves as an electrostatic latent image carrier (photosensitive member), is rotated clockwise by a motor 215. As the photosensitive member 201 rotates, the photosensitive surface thereof moves in the sub-scanning direction, which is perpendicular to the main scanning direction, relative to the light beam 203. A charging roller 202, which uniformly charges the surface of the photosensitive member 201, is disposed at the upper side of the photosensitive member 201 in such a manner that the charging roller 202 is in contact with the surface of the photosensitive member 201. The surface of the photosensitive member 201 charged by the charging roller 202 is irradiated with the light beam 203 emitted from the optical scanning unit 200.

The light beam 203 is modulated on the basis of the image data Di as described above, and an electrostatic latent image is formed on the surface of the photosensitive member 201 by irradiating the surface of the photosensitive member 201 with the light beam 203. The electrostatic latent image is developed as a toner image by a developing unit 207, which is placed in front of the irradiation position in the rotational direction of the photosensitive member 201 in such a manner that the developing unit 207 is in contact with the photosensitive member 201.

The toner image developed by the developing unit 207 is transferred onto a paper sheet 212, which serves as a transfer medium, by a transfer roller 208 disposed at the lower side of the photosensitive member 201 in such a manner that the transfer roller 208 opposes the photosensitive member 201. The paper sheet 212 is stored in a paper cassette 209 placed in front of the photosensitive member 201 (at the right side in FIG. 11). Alternatively, the paper sheet 212 may also be fed manually. A feed roller 210 is placed at an end of the paper cassette 209, and feeds the paper sheet 212 stored in the paper cassette 209.

The paper sheet 212 on which the toner image, which is not yet fixed, is formed is carried to a fixing unit disposed in rear of the photosensitive member 201 (at the left side in FIG. 11). The fixing unit includes a fixing roller 213 which contains a fixing heater (not shown) and a press roller 214 which is pressed against the fixing roller 213. The fixing unit fixes the unfixed toner image formed on the paper sheet 212 carried from the transfer unit by heating the paper sheet 212 while pressing it between the fixing roller 213 and a pressing portion of the press roller 214. In addition, an output roller 216, which is placed in rear of the fixing roller 213, outputs the paper sheet 212 on which the image is fixed outside the image forming apparatus.

Although not shown in FIG. 11, the printer controller 211 not only performs the above-described data conversion, but also controls the motor 215, components in the image forming apparatus, a polygon motor contained in the optical scanning unit 200, etc.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A multi-beam scanning optical system comprising:

a plurality of light sources;

deflecting means which deflects a plurality of laser beams emitted from the light sources; and scanning optical means which focuses the laser beams deflected by the deflecting means onto the surface of a photosensitive member;

wherein the scanning optical means is set such that lateral chromatic aberration is overcorrected, and wherein, among angles formed between each laser beam incident on the surface of the photosensitive member and the normal at the surface of the photosensitive member in a sub-scanning direction, the oscillation wavelength of the light source that emits a laser beam forming the minimum angle is set to a value smaller than the oscillation wavelength of the light source that emits a laser beam forming the maximum angle.

2. A multi-beam scanning optical system according to claim 1, wherein the scanning optical means comprises at least one diffractive optical element.

3. A multi-beam scanning optical system according to claim 1, further comprising synchronization position detection means in which parts of the laser beams deflected by the deflecting means are directed to a synchronization detection element by a synchronization detection lens, and which controls the time at scanning start position on the surface of the photosensitive member by using a signal obtained from the synchronization detection element, wherein the synchronization detection lens is disposed in such a manner that the synchronization detection lens is centered and untilted relative to a light path from the deflecting means to the synchronization detection element.

4. A multi-beam scanning optical system comprising:

n light sources;

deflecting means which deflects n laser beams emitted from the n light sources; and scanning optical means which focuses the n laser beams deflected by the deflecting means onto the surface of a photosensitive member having a cylindrical shape and forms n scanning lines, wherein the scanning optical means is set such that lateral chromatic aberration is overcorrected, and wherein, when the first scanning line is formed on the surface of the photosensitive member at a position displaced from an end point of the photosensitive member by a distance S in a sub-scanning direction and the $m^{th}$ ($1<m \leq n$) scanning line is formed on the surface of the photosensitive member at a position displaced from the end point by a distance (S+d) in the sub-scanning direction, and when the oscillation wavelength of the light source which emits the light beam forming the first scanning line is defined as $\lambda_1$ and the oscillation wavelength of the light source which emits the light beam forming the $m^{th}$ scanning line is defined as $\lambda_m$, the following expressions are satisfied:

$$|\Delta Y_1 - \Delta Y_2(\lambda_m - \lambda_1)| \le \frac{D}{4}$$

$$\Delta Y_1 = \Delta L \tan\alpha$$

$$\Delta L = \sqrt{R^2 - (S+d)^2} - \sqrt{R^2 - S^2}$$

wherein,
  $\Delta Y_2$ is a dot displacement in the main-scanning direction at the end in the main-scanning direction caused per unit wavelength,
  D is the size of a single pixel,
  $\alpha$ is the maximum angle among angles formed between the normal at the surface of the photosensitive member and the laser beams in the main-scanning direction, and
  R is the radius of the photosensitive member.

5. A multi-beam scanning optical system according to claim 4, wherein $\lambda_1$ and $\lambda_m$ satisfy the following expression:

$$-1 \le \lambda_m - \lambda_1 \le 3 \text{ (unit: nm)}.$$

6. A multi-beam scanning optical system according to claim 4, wherein the scanning optical means comprises at least one diffractive optical element.

7. A multi-beam scanning optical system according to claim 4, further comprising synchronization position detection means in which parts of the n laser beams deflected by the deflecting means are directed to a synchronization detection element by a synchronization detection lens, and which controls the time at scanning start position on the surface of the photosensitive member by using a signal obtained from the synchronization detection element,
  wherein the synchronization detection lens is disposed in such a manner that the synchronization detection lens is centered and untilted relative to a light path from the deflecting means to the synchronization detection element.

8. A multi-beam scanning optical system comprising:
a plurality of light sources;
deflecting means which deflects a plurality of laser beams emitted from the light sources; and
scanning optical means which focuses the laser beams deflected by the deflecting means onto the surface of a photosensitive member;
  wherein the scanning optical means is set such that lateral chromatic aberration is undercorrected, and
  wherein, among angles formed between each laser beam incident on the surface of the photosensitive member and the normal at the surface of the photosensitive member in a sub-scanning direction, the oscillation wavelength of the light source that emits a laser beam forming the minimum angle is set to a value larger than the oscillation wavelength of the light source that emits a laser beam forming the maximum angle.

9. A multi-beam scanning optical system according to claim 8, wherein the scanning optical means comprises at least one refractive optical element.

10. A multi-beam scanning optical system according to claim 8, further comprising synchronization position detection means in which parts of the laser beams deflected by the deflecting means are directed to a synchronization detection element by a synchronization detection lens, and which controls the time at scanning start position on the surface of the photosensitive member by using a signal obtained from the synchronization detection element,
  wherein the synchronization detection lens is disposed in such a manner that the synchronization detection lens is centered and untilted relative to a light path from the deflecting means to the synchronization detection element.

11. A multi-beam scanning optical system comprising:
n light sources;
deflecting means which deflects n laser beams emitted from the n light sources; and
scanning optical means which focuses the n laser beams deflected by the deflecting means onto the surface of a photosensitive member having a cylindrical shape and forms n scanning lines,
  wherein the scanning optical means is set such that lateral chromatic aberration is undercorrected, and
  wherein, when the first scanning line is formed on the surface of the photosensitive member at a position displaced from an end point of the photosensitive member by a distance S in a sub-scanning direction and the $m^{th}$ ($1 < m \le n$) scanning line is formed on the surface of the photosensitive member at a position displaced from the end point by a distance (S+d) in the sub-scanning direction, and when the oscillation wavelength of the light source which emits the light beam forming the first scanning line is defined as $\lambda_1$ and the oscillation wavelength of the light source which emits the light beam forming the $m^{th}$ scanning line is defined as $\lambda_m$, the following expressions are satisfied:

$$|\Delta Y_1 - \Delta Y_2(\lambda_1 - \lambda_m)| \le \frac{D}{4}$$

$$\Delta Y_1 = \Delta L \tan\alpha$$

$$\Delta L = \sqrt{R^2 - (S+d)^2} - \sqrt{R^2 - S^2}$$

wherein,
  $\Delta Y_2$ is a dot displacement in the main-scanning direction at the end in the main-scanning direction caused per unit wavelength,
  D is the size of a single pixel,
  $\alpha$ is the maximum angle among angles formed between the normal at the surface of the photosensitive member and the laser beams in the main-scanning direction, and
  R is the radius of the photosensitive member.

12. A multi-beam scanning optical system according to claim 4, wherein $\lambda_1$ and $\lambda_m$ satisfy the following expression:

$$-1 \le \lambda_1 - \lambda_m \le 3 \text{ (unit: nm)}.$$

13. A multi-beam scanning optical system according to claim 11, wherein the scanning optical means comprises at least one refractive optical element.

14. A multi-beam scanning optical system according to claim 11, further comprising synchronization position detection means in which parts of the n laser beams deflected by the deflecting means are directed to a synchronization detection element by a synchronization detection lens, and which controls the time at scanning start position on the surface of the photosensitive member by using a signal obtained from the synchronization detection element, wherein the synchronization detection lens is disposed in such a manner that the synchronization detection lens is centered and untilted relative to a light path from the deflecting means to synchronization detection element.

15. An image forming apparatus comprising:

a multi-beam scanning optical system according to one of claims 1 to 14;

a photosensitive member disposed on a scan surface;

a developing unit which develops an electrostatic latent image formed on the photosensitive member as a toner image, the electrostatic latent image being formed by the laser beams which are emitted from the multi-beam scanning optical system and which scan over the photosensitive member;

a transfer unit which transfers the toner image developed by the developing unit onto a transfer medium; and a fixing unit which fixes the toner image transferred by the transfer unit on the transfer medium.

16. An image forming apparatus comprising:

a multi-beam scanning optical system according to one of claims 1 to 14; and a printer controller which converts code data obtained from an external device into an image signal and inputs the image signal to the multi-beam scanning optical system.

17. A multi-beam scanning optical system comprising:

a plurality of light sources;

deflecting means which deflects a plurality of laser beams emitted from the light sources; and scanning optical means which focuses the laser beams deflected by the deflecting means onto the surface of a photosensitive member;

wherein a dot displacement direction in a main-scanning direction due to a difference in light path lengths of the laser beams is opposite to a dot displacement direction in the main-scanning direction due to a difference in wavelengths of the laser beams.

18. A multi-beam scanning optical system according to claim 17, wherein the dot displacement in the main-scanning direction due to the difference in light path lengths of the laser beams and the dot displacement in the main-scanning direction due to the difference in wavelengths of the laser beams counterbalance each other.

19. An image forming apparatus comprising:

a multi-beam scanning optical system according to one of claims 17 and 18;

a photosensitive member disposed on a scan surface;

a developing unit which develops an electrostatic latent image formed on the photosensitive member as a toner image, the electrostatic latent image being formed by the laser beams which are emitted from the multi-beam scanning optical system and which scan over the photosensitive member;

a transfer unit which transfers the toner image developed by the developing unit onto a transfer medium; and a fixing unit which fixes the toner image transferred by the transfer unit on the transfer medium.

20. An image forming apparatus comprising:

a multi-beam scanning optical system according to one of claims 17 and 18; and a printer controller which converts code data obtained from an external device into an image signal and inputs the image signal to the multi-beam scanning optical system.

* * * * *

UNITED STATES PATENT AND TRADEMARK OFFICE
CERTIFICATE OF CORRECTION

PATENT NO. : 6,650,454 B2
DATED : November 18, 2003
INVENTOR(S) : Junya Azami et al.

It is certified that error appears in the above-identified patent and that said Letters Patent is hereby corrected as shown below:

Column 9,
Line 54, "$\sqrt{R^2 - S^2}$" should read -- $\sqrt{R^2 - S^2}$ --.

Column 10,
Line 30, "tan $\Delta_R$" should read -- tan $\alpha_R$ --.

Column 12,
Lines 5 and 7, "extend" should read -- extends --.

Column 13,
Line 15, "$D_{6c}$" should read -- $D_{6e}$ --.

Column 20,
Line 21, "member;" should read -- member, --.

Column 21,
Line 50, "member;" should read -- member, --.

Column 23,
Line 33, "member;" should read -- member, --.

Signed and Sealed this

Thirty-first Day of August, 2004

JON W. DUDAS
*Director of the United States Patent and Trademark Office*